US008827787B2

(12) United States Patent
Smith et al.

(10) Patent No.: US 8,827,787 B2
(45) Date of Patent: Sep. 9, 2014

(54) SYSTEMS, METHODS, AND DEVICES FOR PLAYING WAGERING GAMES WITH SKILL-BASED AND NON-SKILL-BASED GAME FEATURES

(71) Applicant: WMS Gaming Inc., Waukegan, IL (US)

(72) Inventors: Jesse Smith, Chicago, IL (US); Joel R. Jaffe, Glenview, IL (US); Sean P. Kelly, Skokie, IL (US)

(73) Assignee: WMS Gaming Inc., Waukegan, IL (US)

( * ) Notice: Subject to any disclaimer, the term of this patent is extended or adjusted under 35 U.S.C. 154(b) by 31 days.

(21) Appl. No.: 13/762,701

(22) Filed: Feb. 8, 2013

(65) Prior Publication Data

US 2014/0228086 A1 Aug. 14, 2014

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |

(52) U.S. Cl.
USPC .................................... 463/7; 463/23; 463/31

(58) Field of Classification Search
USPC .................................................. 463/7, 23, 31
See application file for complete search history.

(56) References Cited

U.S. PATENT DOCUMENTS

| | | | |
|---|---|---|---|
| 5,401,023 | A | 3/1995 | Wood |
| 5,882,258 | A | 3/1999 | Kelly |
| 6,007,426 | A | 12/1999 | Kelly et al. |
| 6,110,043 | A | 8/2000 | Olsen |
| 6,203,429 | B1 | 3/2001 | Demar et al. |
| 6,217,448 | B1 | 4/2001 | Olsen |
| 6,293,866 | B1 | 9/2001 | Walker et al. |
| 6,309,300 | B1 | 10/2001 | Glavich |
| 6,390,473 | B1 | 5/2002 | Vancura et al. |
| 6,435,511 | B1 | 8/2002 | Vancura et al. |
| 6,554,283 | B2 | 4/2003 | Vancura et al. |
| 6,692,005 | B2 | 2/2004 | Vancura et al. |
| 6,733,386 | B2 | 5/2004 | Cuddy et al. |
| 6,761,632 | B2 | 7/2004 | Bansemer et al. |
| 6,837,788 | B2 | 1/2005 | Cannon |
| 7,001,273 | B2 | 2/2006 | Baerlocher |
| 7,037,191 | B2 | 5/2006 | Rodgers et al. |
| 7,037,195 | B2 | 5/2006 | Schneider et al. |

(Continued)

FOREIGN PATENT DOCUMENTS

| | | |
|---|---|---|
| JP | 2005-007017 | 1/2005 |
| JP | 2007-144226 | 6/2007 |
| WO | 2006-135608 | 12/2006 |
| WO | 2010-057061 | 5/2010 |

*Primary Examiner* — William M. Brewster
(74) *Attorney, Agent, or Firm* — Nixon Peabody LLP

(57) ABSTRACT

Gaming devices, gaming systems, methods of conducting wagering games, and computer programs for executing wagering games are disclosed. A gaming system for playing a wagering game is disclosed which includes one or more processors and one or more memory devices storing instructions that, when executed by at least one of the processors, cause the gaming system to: receive a wager to play the wagering game; direct a display device to display a randomly determined outcome of a base game of the wagering game; in response to a triggering event, initiate play of a non-skill-based game feature and, further in response to receiving a player selection of a skill-based game feature, initiate play of the skill-based game feature; determine an award value for the skill-based game feature; determine an award value for the non-skill-based game feature; and, award to the player only the higher of the two award values.

25 Claims, 8 Drawing Sheets

(56) References Cited

U.S. PATENT DOCUMENTS

| | | | |
|---|---|---|---|
| 7,074,127 | B2 | 7/2006 | Cuddy et al. |
| 7,096,079 | B2 | 8/2006 | Matsuura et al. |
| 7,235,011 | B2 | 6/2007 | Randall et al. |
| 7,303,469 | B2 | 12/2007 | Kaminkow |
| 7,528,835 | B2 | 5/2009 | Templeman |
| 8,012,023 | B2 | 9/2011 | Gates et al. |
| 8,177,621 | B2 | 5/2012 | Jaffe et al. |
| 8,308,556 | B2 | 11/2012 | Thomas |
| 2001/0051541 | A1 | 12/2001 | Matsuura et al. |
| 2002/0027323 | A1 | 3/2002 | Vancura et al. |
| 2002/0190471 | A1 | 12/2002 | Vancura et al. |
| 2003/0064780 | A1 | 4/2003 | Baerlocher et al. |
| 2003/0119576 | A1 | 6/2003 | McClintic et al. |
| 2003/0193139 | A1 | 10/2003 | Vancura et al. |
| 2003/0199312 | A1 | 10/2003 | Walker et al. |
| 2003/0207708 | A1 | 11/2003 | Sadri et al. |
| 2004/0009811 | A1 | 1/2004 | Torango |
| 2004/0048644 | A1 | 3/2004 | Gerrard et al. |
| 2005/0159214 | A1 | 7/2005 | Rohde et al. |
| 2005/0164779 | A1 | 7/2005 | Okuniewicz |
| 2006/0030403 | A1 | 2/2006 | Lafky et al. |
| 2006/0073889 | A1 | 4/2006 | Edidin et al. |
| 2006/0089196 | A1 | 4/2006 | Parham et al. |
| 2008/0254893 | A1 | 10/2008 | Patel et al. |
| 2011/0218035 | A1 | 9/2011 | Thomas |
| 2012/0115581 | A1 | 5/2012 | Englman et al. |
| 2014/0087869 | A1* | 3/2014 | Thorne ........................... 463/31 |

* cited by examiner

SYSTEMS, METHODS, AND DEVICES FOR PLAYING WAGERING GAMES WITH SKILL-BASED AND NON-SKILL-BASED GAME FEATURES

COPYRIGHT

A portion of the disclosure of this patent document contains materials which are subject to copyright protection. The copyright owner has no objection to the facsimile reproduction by anyone of the patent disclosure as it appears in the U.S. Patent and Trademark Office patent files or records, but otherwise reserves all copyright rights whatsoever.

TECHNICAL FIELD

The present disclosure relates generally to wagering games, as well as wagering game terminals and gaming systems. More particularly, aspects of the present disclosure relate to wagering games with both skill-based and non-skill-based components.

BACKGROUND

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Thus, gaming manufacturers continuously endeavor to develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "primary" or "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio.

Another concept that has been employed is the use of progressive jackpots. In the gaming industry, a "progressive jackpot" involves collecting coin-in data from participating gaming device(s), such as slot machines, contributing a percentage of that coin-in data to a jackpot amount, and awarding that jackpot amount to a player upon the occurrence of a jackpot-winning event. A jackpot-winning event typically occurs when a "progressive winning position" is achieved at a participating gaming device. If the gaming device is a slot machine, a progressive winning position may, for example, correspond to alignment of progressive jackpot reel symbols along an active payline. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate.

Skill-based wagering games and game features have been known to garner new and more frequent game play from some players. Skill-based games typically offer a greater degree of player involvement and interaction than their non-skill-based counterparts. Unlike non-skill-based games where the game outcome is predominantly, if not solely based on chance (e.g., a random selection made by a computer processor), skill-based games are games in which the outcome of the game is predominantly, if not solely determined by a player's physical skill (e.g., reflex or dexterity) or mental skill (e.g., logical reasoning, strategic thinking, trivia knowledge). Most games of skill do have an element of chance; however, the player's skill is significantly more influential in determining the game's outcome. In general, there are three basic types of skill-based games: games that involve the use of strategy, games that rely on the player's knowledge and/or past experiences, and games that require hand-eye coordination. Each type has its advantages and drawbacks.

In some strategy-based games, there are clear rules from which the player can infer the most optimal choices. An example of this type is Tic-Tac-Toe, where playing in certain squares first can guarantee the player at least a draw. Some experience and knowledge-based games require the player to make decisions without knowing which choices lead to what outcomes. An example of this type is a game in which the player must decide whether to redeem an award worth a certain credit amount or try for another worth potentially more, but also potentially less. Some players may have more knowledge/experience as it pertains to a particular game and, thus, may have an advantage over other players. In hand-eye-coordination type games, the player uses reflex and manual dexterity to try and achieve the best results. An example of such a game is "Pong," where the player controls the movement of a computerized paddle to deflect a bouncing ball. In such games, certain players may have a physical advantage over other players.

Wagering games are typically designed to minimize elements of skill because many gaming regulations prohibit giving certain players an advantage or "edge" over other players. Skill-based games often end up with some disadvantaged players who, for example, use less than the most optimal strategy, do not make the best decisions, or are at a physical disadvantage. As a result, these players wind up with less than their expected share of winnings, thus producing a less than desirable gaming experience. Accordingly, what is needed is a wagering game with a skill-based component to attract players, but which does not leave unskilled players at a disadvantage to other skilled players. Such new features will further enhance player excitement, perpetuate player loyalty, and thus increase game play and profitability to hosts and operators.

SUMMARY

According to one aspect of the present disclosure, a gaming system is disclosed for conducting a wagering game. The wagering game includes a base game, a skill-based game feature and a non-skill based game feature. The skill-based game feature includes outcomes that are based solely or predominantly on player skill. Contrastingly, the non-skill-based game feature includes outcomes that are based solely or predominantly on randomized determinations. The gaming system includes one or more processors and one or more memory devices. The memory device(s) stores instructions that, when executed by at least one of the one or more processors, cause the gaming system to: receive an indication of a wager from a player to play the wagering game; direct at least one display device to display a randomly determined outcome of the base game portion of the wagering game; in response to a triggering event, initiate play of the non-skill-based game feature and, further in response to receiving an indication of a player selection of the skill-based game feature, initiate play of the skill-based game feature; determine a first award value, if any, for the skill-based game feature; determine a second award value, if any, for the non-skill-based game feature; and, award to the player only the higher of the first and second award values.

In accordance with another aspect of the disclosure, one or more physical non-transitory machine-readable storage media are featured which include instructions which, when executed by one or more processors, cause the one or more processors to perform operations comprising: receive an indication of a wager to play a wagering game; direct at least one display device to display a randomly determined outcome of a base game of the wagering game; in response to a triggering event, initiate play of a non-skill-based game feature and, further in response to receiving an indication of a player selection of a skill-based game feature, initiate play of the skill-based game feature; determine a first award value, if any, for the skill-based game feature; determine a second award value, if any, for the non-skill-based game feature; and award to a player only the higher of the first and second award values.

Other aspects of the present disclosure are directed to a gaming system for conducting a wagering game. The gaming system includes one or more input devices, one or more display devices, one or more processors, and one or more memory devices. The memory device(s) stores instructions that, when executed by at least one of the one or more processors, cause the gaming system to: display, via at least one of the one or more display devices, a randomly determined outcome of a base game portion of the wagering game; in response to a bonus-game-triggering symbol combination in the outcome of the base game, initiate play of a non-skill-based bonus game and, further in response to receiving an indication of a player selection of a skill-based bonus game, initiate play of the skill-based bonus game; determine a first award value for a player-skill-based outcome resulting from play of the skill-based bonus game; determine a second award value for a randomly determined outcome resulting from play of the non-skill-based bonus game; and, award to the player only the higher of the first and second award values.

Another aspect of this disclosure is directed to a computer-implemented method of conducting a wagering game with a gaming system. The gaming system includes one or more input devices, one or more display devices, and one or more processors. The method includes: receiving, via at least one of the one or more input devices, an indication of a wager from a player to play the wagering game; displaying, via at least one of the one or more display devices, a randomly determined outcome of a base game portion of the wagering game; in response to a triggering event, initiating play of a non-skill-based game feature and, further in response to receiving an indication of a player selection of a skill-based game feature, initiating play of the skill-based game feature via at least one of the one or more processors; displaying, via at least one of the one or more display devices, a player-skill-based outcome of the skill-based game feature and a randomly determined outcome of the non-skill-based game feature; determining a first award value, if any, for the skill-based game feature; determining a second award value, if any, for the non-skill-based game feature; and, awarding to the player only the higher of the first and second award values.

The above summary is not intended to represent each embodiment or every aspect of the present disclosure. Rather, the summary merely provides an exemplification of some of the novel features presented herein. The above features and advantages, and other features and advantages of the present disclosure, will be readily apparent from the following detailed description of exemplary embodiments and modes for carrying out the present invention when taken in connection with the accompanying drawings and the appended claims.

Figure 1:
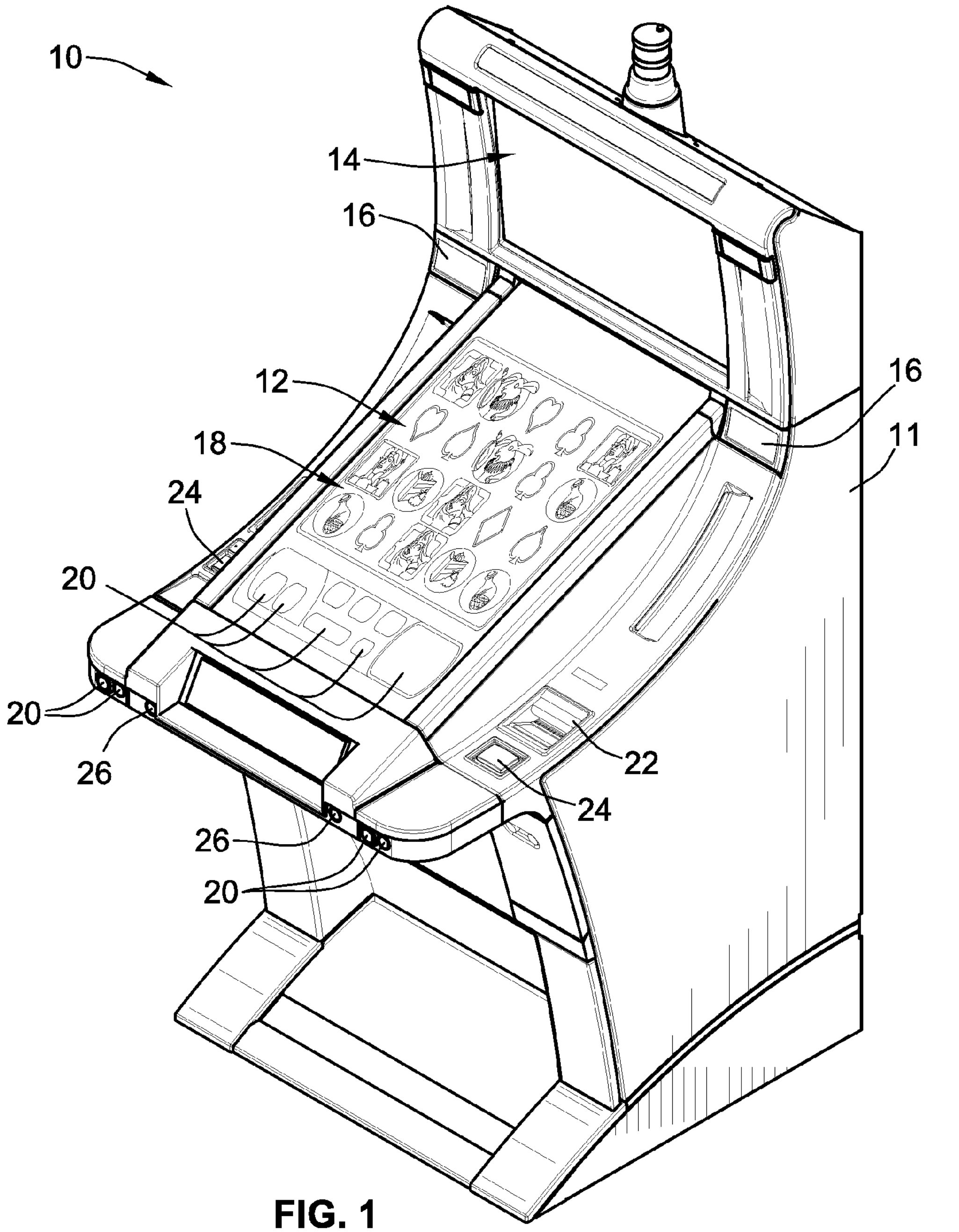
FIG. 1 is a perspective-view illustration of an example of a free-standing gaming terminal according to aspects of the present disclosure.

While aspects of this disclosure are susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

This invention is susceptible of embodiment in many different forms. There are shown in the drawings and will herein be described in detail representative embodiments of the invention with the understanding that the present disclosure is to be considered as an exemplification of the principles of the invention and is not intended to limit the broad aspects of the invention to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" mean "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

For purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to the drawings, wherein like reference numerals refer to like features throughout the several views, there is shown in FIG. 1 a representative gaming terminal 10 similar to those used in gaming establishments, such as casinos, hotels and cruise ships, and non-conventional gaming establishments, such as airports and restaurants. With regard to the present disclosure, the gaming terminal 10 may be any type of gaming terminal and may have varying structures and methods of operation. For example, in some aspects, the gaming terminal 10 is an electromechanical gaming terminal configured to play slots with mechanical reels, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models (as shown), handheld mobile devices, bartop models, workstation-type console models, etc. Further, the gaming terminal 10 may be primarily dedicated for use in conducting wagering games, or may include non-dedicated devices, such as mobile phones, personal digital assistants, personal computers, etc. Exemplary types of gaming terminals are disclosed in U.S. Pat. No. 6,517,433, U.S. Patent Application Pub. Nos. 2010/0062196 and 2010/0234099, and International Application No. PCT/US2007/000792, all of which are incorporated herein by reference in their respective entireties and for all purposes.

The gaming terminal 10 illustrated in FIG. 1 comprises a cabinet 11 that may house various input devices, output devices, and input/output devices. By way of non-limiting example, the gaming terminal 10 includes a primary display area 12, a secondary display area 14, and one or more audio speakers 16. The primary display area 12 or the secondary display area 14 may be a mechanical-reel display, a video display, or a combination thereof in which a transmissive video display may be disposed in front of the mechanical-reel display to portray a video image superimposed upon the mechanical-reel display. The display areas may variously display information associated with wagering games, non-wagering games, community games, progressive games, advertisements, services, premium entertainment, text messaging, emails, alerts, announcements, broadcast information, subscription information, etc., appropriate to the particular mode(s) of operation of the gaming terminal 10. The gaming terminal 10 includes a touch screen(s) 18 mounted over the primary and/or secondary areas 12, 14, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals can be selected from a group consisting essentially of an electrical current, an electrical voltage, an electrical charge, an optical signal, an optical element, a magnetic signal, and a magnetic element.

Figure 2:
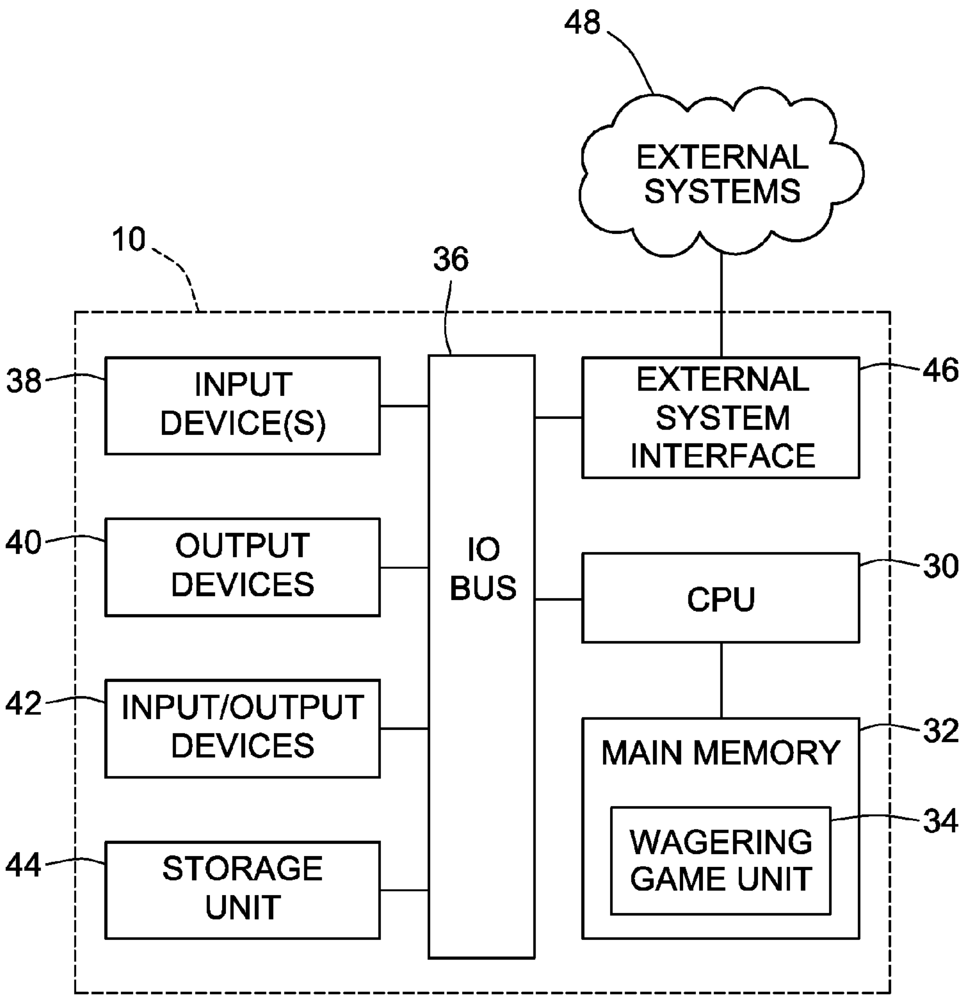
FIG. 2 is a schematic diagram of an example of a gaming system according to aspects of the present disclosure.

Turning now to FIG. 2, there is shown a block diagram of the gaming-terminal architecture. The gaming terminal 10 includes a central processing unit (CPU) 30 connected to a main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The main memory 32 includes a wagering game unit 34. In one embodiment, the wagering game unit 34 may present wagering games, such as video poker, video black jack, video slots, video lottery, etc., in whole or part.

The CPU 30 is also connected to an input/output (I/O) bus 36, which can include any suitable bus technologies, such as an AGTL+frontside bus and a PCI backside bus. The I/O bus 36 is connected to various input devices 38, output devices 40, and input/output devices 42 such as those discussed above in connection with FIG. 1. The I/O bus 36 is also connected to storage unit 44 and external system interface 46, which is connected to external system(s) 48 (e.g., wagering game networks).

The external system 48 includes, in various aspects, a gaming network, other gaming terminals, a gaming server, a remote controller, communications hardware, or a variety of other interfaced systems or components, in any combination.

In yet other aspects, the external system 48 may comprise a player's portable electronic device (e.g., cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes a random number generator (RNG) for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external system 48 ("thin client" gaming terminal), or are distributed therebetween in any suitable manner ("intermediate client" gaming terminal).

The gaming terminal 10 may include additional peripheral devices or more than one of each component shown in FIG. 2. Any component of the gaming terminal architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic disk storage media, optical storage media, flash memory, etc.

Figure 3:
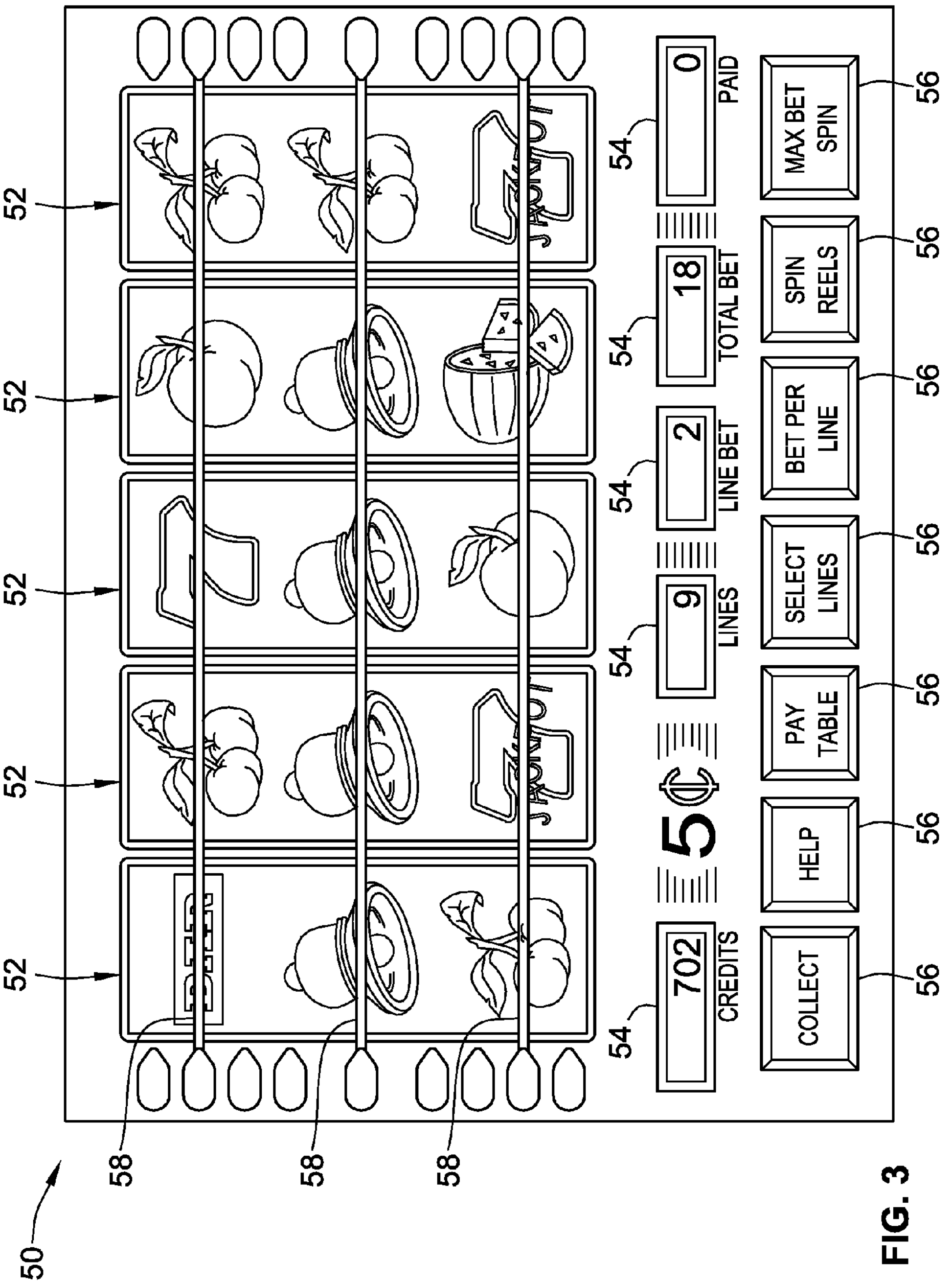
FIG. 3 is a screen shot of a representative basic-game screen of a wagering game displayed on a gaming terminal, gaming device, and/or gaming system according to aspects of the present disclosure.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The CPU operate(s) to execute a wagering game program causing the primary display area 12 or the secondary display area 14 to display the wagering game.

In response to receiving a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 12 or secondary display 14) through the display of information such as, but not limited to, text, graphics, static images, moving images, etc., or any combination thereof. In accord with the method of conducting the wagering game, the CPU transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the CPU (e.g., CPU 30) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 44), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by an RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

Figure 4:
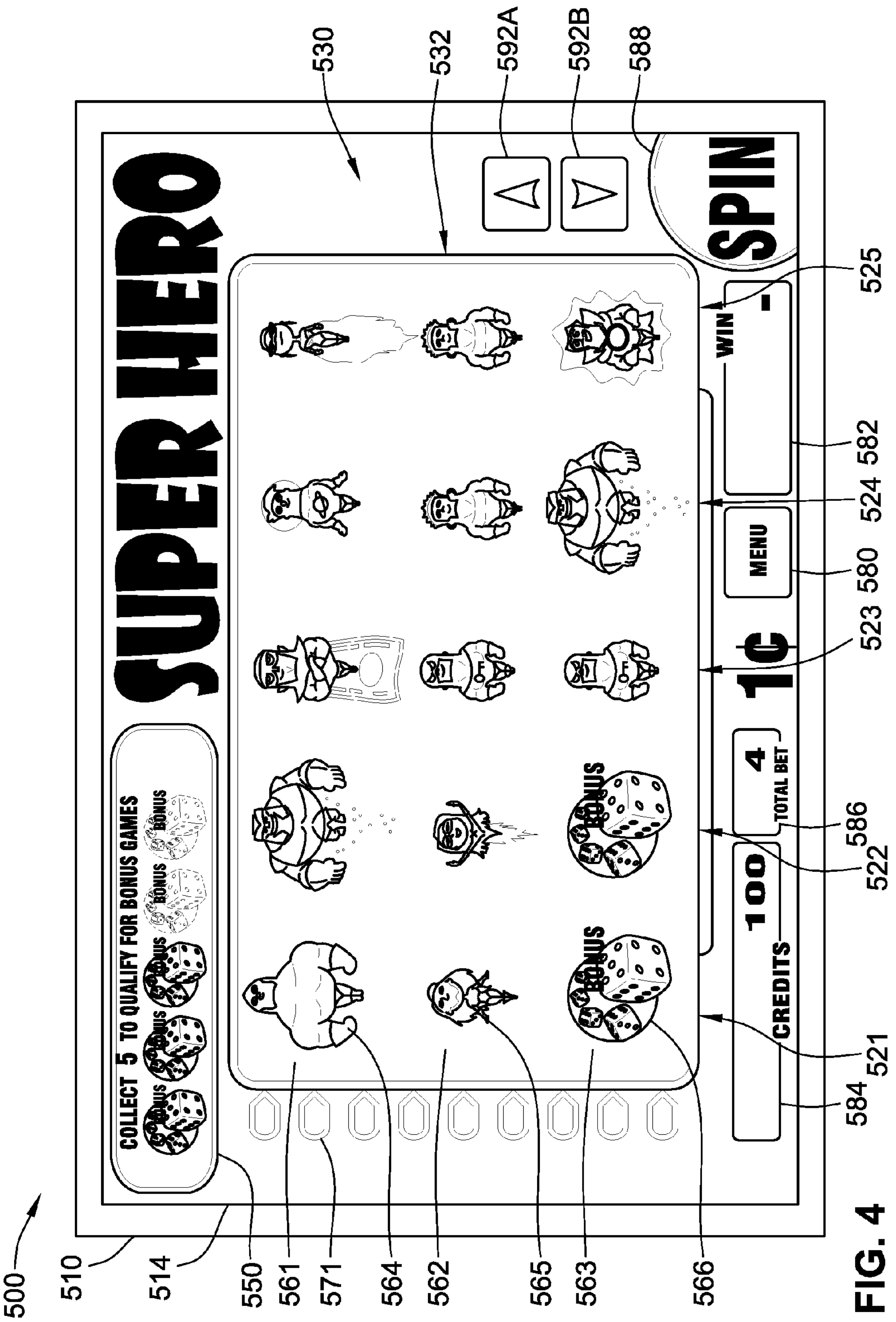
FIG. 4 is a screen shot of a representative basic-game screen of an exemplary wagering game with a skill-based game feature and a non-skill-based game feature in accordance with aspects of the present disclosure.

FIG. 4 is a screen shot of a game screen from an exemplary wagering game in accordance with aspects of the present disclosure. A primary display 514 of a gaming device or terminal 510, which may be part of an exemplary gaming system 500, is shown is FIG. 4. The gaming system 500 may be similarly configured to the gaming system shown in FIG. 2. The gaming terminal 510 of FIG. 4 can take on various alternative configurations, including, without limitation, upright freestanding gaming machines, slant-top freestanding gaming machines, handheld and portable gaming machines, countertop gaming machines, personal computers and laptop computers, smartphones, tablet computers, or other known gaming devices, individually or in any combination thereof. The primary display device 514 of the gaming terminal 510 displays wagering games, such as those described above with respect to FIGS. 1-3 or those described below with respect to FIGS. 4-8, for example. The display device 514 may be any form of display, such as those described with reference to the free-standing gaming terminal 10 of FIG. 1. For instance, the primary display 514 may comprise a plasma, LED, OLED, LCD, CRT, projection, or any other now-known or later-developed display device. Although numerous aspects of the wagering game 530 are all shown displayed on a single display device (i.e., the primary display 514), these aspects are not so limited and can be displayed in any combination on any number of display devices unless otherwise expressly prohibited.

The display device 514 displays or otherwise visually depicts a wagering game 530, which in this example is the slot game shown in FIG. 4. The slot game 530 includes a plurality of symbol-bearing reels, designated generally as 521-525, respectively, each having a plurality of distinct symbol positions (collectively represented by three symbol positions 561-563) and bearing a number of symbols (collectively represented by three symbols 564-566). The symbols may include any variety of graphical symbols, emblems, elements, or representations, including symbols that are associated with one or more themes of the gaming terminal 510 and gaming system 500 (e.g., a Super Duper Heroes theme). The symbols may also include a blank symbol or empty space. The symbols on the reels 521-525 are arranged in an array 532, which in this embodiment is a 3×5 matrix (i.e., three rows by five columns) of symbols. The reels 521-525 are varied (e.g., spun and stopped) to reveal combinations of symbols in the array 532, which represent randomly selected outcomes of the wagering game 530, that are evaluated for winning symbol combinations. Winning combinations of symbols landing, for example, on activated paylines (e.g., those paylines for which a wager has been received), cause awards to be paid in accordance with one or more pay tables associated with the wagering game 530.

Within the scope of this disclosure, the wagering game 530 can include greater or fewer than five symbol-bearing reels (simulated, mechanical, or otherwise) and, in some embodiments, greater or fewer symbol positions than those shown in FIG. 4. In this regard, the randomly selected outcomes may comprise greater or fewer than 15 symbols, and may take on a variety of different forms having greater or fewer rows and/or columns. The matrix may even comprise other non-rectangular forms or arrangements of symbols. Moreover, the randomly selected outcomes of the wagering game 530 may be varied from the representation provided in FIG. 4. Likewise, the Super Duper Heroes game theme is purely illustrative and non-limiting in nature.

The primary display 514 further includes certain display features for providing information and options to a player. For example, the display 514 features may include a MENU button 580, a WIN meter 582, a CREDITS meter 584, and a TOTAL BET meter 586. The MENU button 580 can be pressed and activated (e.g., through an overlying touch screen) by a player desiring to access other control menus, preferences, help screens, informational menus, etc. For example, the player can change a theme of the wagering game 530 via the MENU button 580, or change the type of the wagering game (e.g., to video poker, keno, etc.). The WIN meter 582 displays to the player the amount of the total win (if any) from the most recent play of the wagering game 530. The CREDITS meter 584 displays to the player the total amount of credits (if any) remaining and available to the player for play of the wagering game 530. The TOTAL BET meter 586 displays to a player the current size of his/her wager (in credits). Once a number of paylines are selected and a wager is placed, a SPIN button 588 can be pressed or otherwise activated by a player to effectuate rotation of the reels 521-525. In an optional configuration, selection of a SPIN button will effectuate rotation of the reels 521-525 without requiring prior selection of a wager and/or a number of paylines (e.g., a default wager and a default number of payline(s) are automatically chosen upon selection of the SPIN button 588).

Fewer, additional, or alternative display features may be included for presenting information and/or options to a player. In one specific instance, a row of player-selectable LINES buttons can be provided to give players the option of quickly selecting and activating a predetermined number of paylines (e.g., 1, 5, 9, 20 or 40 lines). Another option would be to display a row of player-selectable PER LINE buttons, which gives a player the option of quickly selecting a predetermined bet per active payline (e.g., 1, 2, 3, 5 and 10 credits per activated payline). The primary display 514 can also include, for example, an optional CHANGE DENOM button that can be activated to change the denomination of each wagered credit (e.g., from 1¢ per credit to 25¢ per credit) which the player is inputting into the system 500. Other features may include, in some non-limiting examples, one or more bet change buttons 592A and 592B that permit a player to incrementally increase and/or decrease the size of his/her wager, a MAX BET SPIN button (not shown) for wagering a maximum number of credits and contemporaneously varying the reels of the wagering game 530, as well as any of the other buttons and meters presented herein or other features now known or hereinafter developed.

The wagering game 530 is shown in FIG. 4 after play of a base game segment is initiated, for example, by the player providing a wager (e.g., responsive to an input via at least one input device), and thereafter pressing a spin button or pulling a spin lever. The monetary wager, which is typically a selected number of credits, is deducted from the available credits, e.g., the 100 credits displayed via the CREDITS meter 584 in FIG. 4. The monetary wager that is in play (e.g., 4 credits in FIG. 4) can be displayed via the TOTAL BET meter 586. The reels 521-525 may then be varied (e.g., spun and stopped); the reels 521-525 continue to spin until they are stopped to reveal in the symbol array 532 symbols which represent a randomly selected outcome of the wagering game 530. The wagering-game outcome is, according to some aspects, randomly determined from a plurality of potential wagering-game outcomes. As indicated above, each outcome is evaluated for winning symbol combinations to determine if the displayed outcome has one or more awards associated therewith.

A local controller (e.g., CPU 30 of FIG. 2), a host system (e.g., external system 48 of FIG. 2), a central controller, or any combination thereof, in alternative embodiments, operates to execute the wagering game program causing the display area 514 to display selected portions of the wagering game 530.

An outcome of the wagering game 530, be it for a base portion, a bonus portion, a progressive portion, a community portion, or otherwise, can be randomly selected from a predetermined set of potential wagering-game outcomes (e.g., using a local random number generator (RNG)). The wagering-game outcome is then revealed, displayed, or otherwise communicated to the player, for example, on a corresponding display device 514. The game screen 514 displays the wagering-game outcome by portraying the plurality of simulated reels 521-525 spinning and stopping to reveal reel symbols arranged in a 3-row, 5-column matrix—i.e., symbol array 532. A winning combination occurs, for example, when the displayed symbols correspond to one or more of the winning symbol combinations listed in a predetermined pay table. In response, a wagering-game prize (e.g., a monetary award of credits) associated with a winning outcome is conferred upon the player.

With continuing reference to the example portrayed in FIG. 4, after a game initiating "first" wager is received from a player to play the wagering game 530, and play is initiated, an outcome of the base-game portion of the wagering game 530 is randomly selected and visually represented by 15 symbols arranged on the primary display device 514 in the 3×5 array 532. The base-game outcome of FIG. 5 includes a "start-bonus" or "bonus-game-triggering" outcome. In the illustrated embodiment, a bonus game is initiated when the player collects a predetermined number of BONUS symbols 566 (e.g., five in FIG. 4) during play of the base-game portion of the wagering game 530. A bonus symbol bank 550 on the display 514 shows the number of BONUS symbols 566 that have already been collected by the player; in the illustrated example, the player has already collected three BONUS symbols 566. In the most recent base-game outcome of the wagering game 530, the first and second reels 521 and 522, respectively, each includes a BONUS symbol 566 in the third row of the array 532. Thus, the player has now collected the requisite five BONUS symbols 566 to trigger a bonus game feature.

According to the illustrated embodiment, entering into a bonus-game portion of the wagering game 530 is provided in response to a triggering event in the base-game outcome of the wagering game 530. The triggering event may be in the nature of a collection-based trigger, as discussed above, or may comprise a symbol-combination-based trigger, a time-based trigger, a wager-based trigger, a mystery trigger, etc., in or during the basic wagering game. An alternative example of a symbol-based trigger may require a predetermined number of BONUS symbols 566 appearing on an active payline in the base-game outcome. It is within the scope and spirit of the present disclosure to employ alternative mechanisms for triggering a bonus game feature. Optionally, entering into the skill-based and non-skill-based bonus games and game features discussed herein may not require a triggering event.

In some embodiments, a player may be required to meet certain eligibility requirements to qualify for entry into the skill-based and non-skill-based bonus games and game features. The eligibility may be based on a number of factors, including acquisition of certain game assets (e.g., a key), reaching certain game milestones (e.g., completing a threshold level in a bonus game), exceeding a certain level of wagering activity, being a member of a certain gaming establishment group (e.g., casino player's club), and the like. An eligibility requirement, however, is not merely the submission of credits to initiate play of the base-game portion of a wagering game.

Some embodiments may require the player to submit additional credits ("second wager" or "side wager"), on top of the original "first" wager received to initiate the wagering game, to qualify for entry into the skill-based and non-skill-based bonus games and game features. The amount of additional credits required for the second wager may depend, for example, on the number of credits entered as the first wager. Some configurations can allow players to use virtual currency (e.g., Facebook® credits) to qualify for entry. As opposed to submitting an additional "second" wager to qualify for entry into the skill-based and non-skill-based bonus games and game features, characteristics of the wagering game can be modified to offset the additional winning opportunities garnered by the skill-based and non-skill-based bonus games and game features. This concept will be developed in further detail below.

Figure 5:
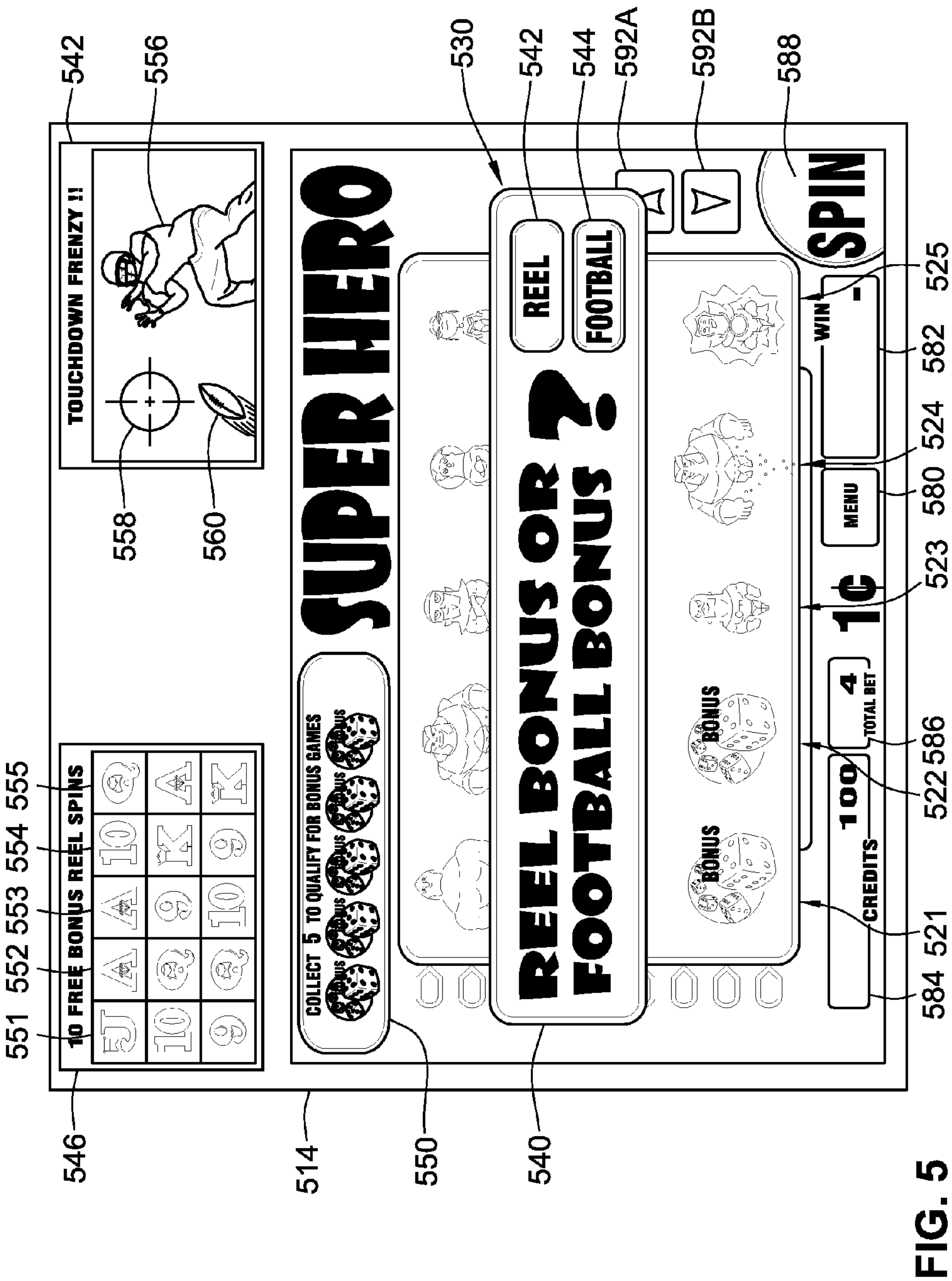
FIG. 5 is a screen shot of the exemplary wagering game of FIG. 4, showing a pop-up window prompting a player to select play of the skill-based game feature or play of the non-skill-based game feature.
Figure 6:
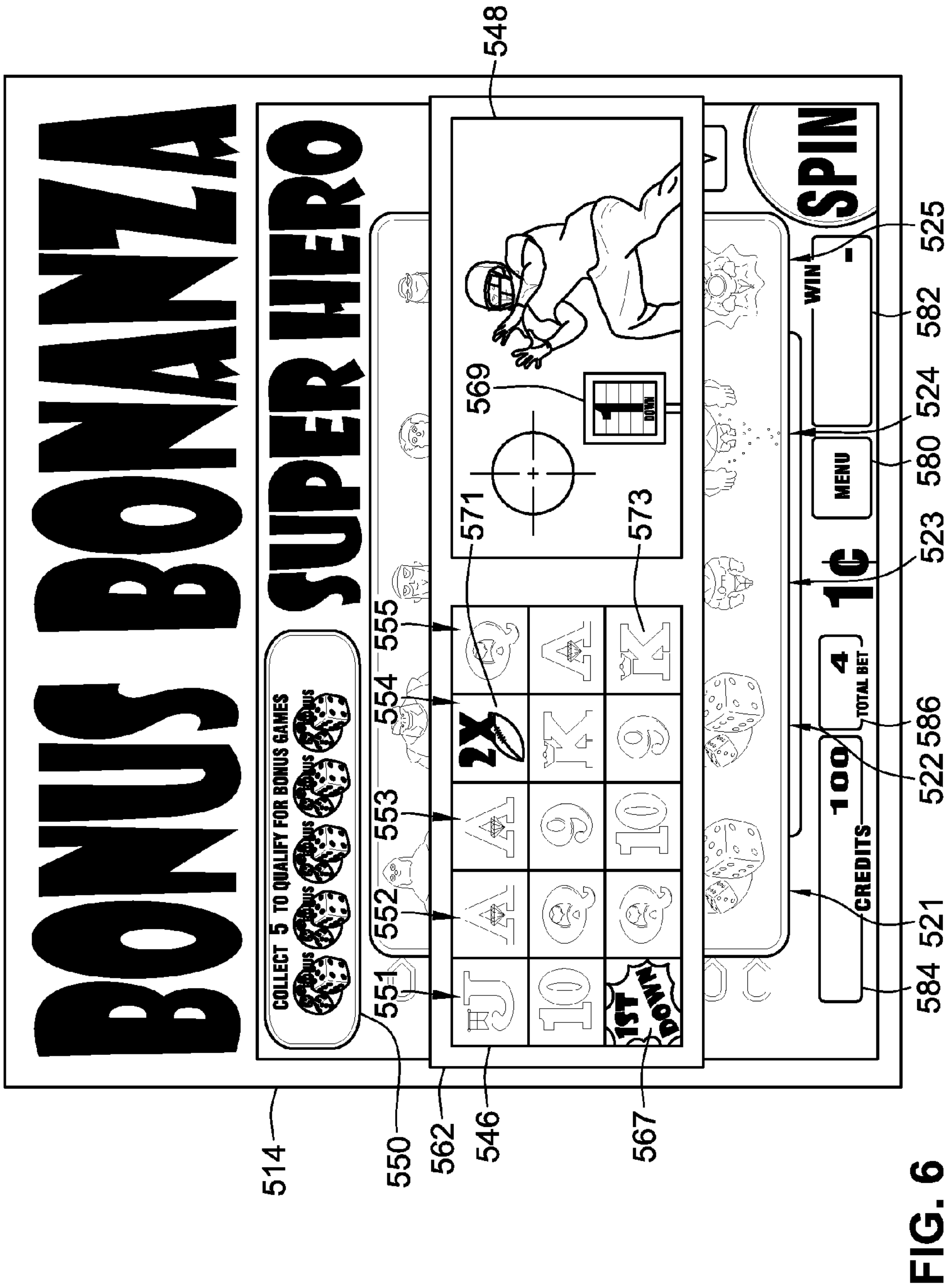
FIG. 6 is a screen shot of the exemplary wagering game of FIG. 4, showing play of the skill-based and non-skill-based game features.

During play of the wagering game 530, which may include any time prior to, during, or after which the reels 521-525 are spun and stopped, or any time that a player is present at the gaming terminal 510, a certain triggering event(s) may trigger activation of one or more skill-and-chance gaming features or special events. Continuing with the above example wherein a bonus game has been triggered, the player can be provided with two options: the player can elect to initiate and play in a skill-based game feature, or the player can elect to initiate and play in a non-skill-based game feature. Alternative configurations may allow this selection to be made prior to or during the spinning and stopping of the reels 521-525. With the five BONUS symbols 566 displayed in the bonus symbol bank 550 of FIG. 5, the player may be asked, e.g., via a popup window 540, whether to play the REEL BONUS OR FOOTBALL BONUS? in the skill-and-chance gaming feature. As seen in FIG. 5, the player has elected to initiate and play in a skill-based game feature by selecting the FOOTBALL bonus game button 544 (e.g., via an overlaying touch screen); the player did not select the REEL bonus game button 542. Optional variations may forego a visual or audible prompt; such configurations can allow or require the player to make a selection prior to or during each, every, or only selected plays of the wagering game 530. In other alternative implementations, the selection may be omitted, automated and/or randomized. Providing the player with an option to select between the skill-based and non-skill-based game features may optionally include providing information regarding the potential awards associated with each of the game features 546 and 548.

In the example illustrated in FIG. 5, the non-skill-based game feature is a "game of chance," which is represented herein by a free-spin bonus game 546, the outcomes of which are each based predominantly, if not solely on a randomized determination. The free-spin bonus game 546 is a slot game that may be similar in function and operation to the base-game portion of the wagering game 530 of FIG. 4, employing numerous symbol-bearing bonus reels 551-555 that are varied (e.g., spun and stopped) to display randomly selected symbols at respective positions on the reels. The player can be awarded an award based on an evaluation of each displayed arrangement of symbols. The free-spin bonus game 546 may conclude after completion of a predetermined, randomly determined, and/or accumulated number of free spins (e.g., 10 free spins in FIG. 5). One such free-spin bonus game is the Monopoly™ Free Spin Bonanza Bonus available from WMS Gaming Inc. Alternatively, play of the non-skill-based game feature can continue until play of the skill-based game feature, described below, is completed. The free-spin bonus game 546 is purely illustrative in nature; thus, the non-skill-based game feature may take on a variety of alternative configurations, including, without limitation, craps, roulette, pachinko, keno, etc.

By way of contrast to the non-skill-based game feature, the skill-based game feature is a type of game in which a player must utilize strategy, knowledge, physical skill, dexterity, and/or other types of abilities to manipulate, organize, select, and/or in any other way control game play elements to accomplish winning game outcomes. The skill-based game feature of FIG. 5 is a "game of skill," which is represented herein by an American football video game 548 in which the outcomes are based predominantly, if not solely on player skill. The football bonus game 548 requires the player to use hand-eye coordination, as well as their reflexive capabilities, to attempt to complete touchdown passes to a receiver in a virtual football game. More specifically, as a number of virtual receivers 556 are displayed running across a virtual football field, the player, who acts as the team's quarterback, uses one or more input devices (e.g., a mouse, joystick, or touchscreen) to align a target 558 with the receiver 556, and then "throw" a virtual football 560 to the receiver 556. Different types of pass completions can have a different award value associated therewith: a short completion for less than ten yards awards five (5) credits; a first-down completion awards ten (10) credits; a medium completion of 20-35 yards awards twenty-five (25) credits; a long completion of 36 yards or more awards forty (40) credits; and, a touchdown pass awards one hundred (100) credits. The football video game 548 may conclude after the player attempts a predetermined, randomly determined, and/or accumulated number of free throws (e.g., 10 throws in FIG. 5). Alternatively, play of the skill-based game feature can continue until play of the non-skill-based game feature is completed.

The skill-based game feature may take on a variety of alternative configurations, including, without limitation, trivia games, strategy games, board games, role games, arcade games, player vs. player (PVP) games, pinball, skee-ball, mechanical games, electro-mechanical games, etc. An example of a skill-based strategy game is the Clue™ Community Progressive™ jackpot game available from WMS Gaming Inc. Additional information regarding wagering games with a skill-based game feature can be found in U.S. Pat. No. 8,308,556 B2, to Alfred Thomas, U.S. Pat. No. 8,177,621 B2, to Joel R. Jaffe et al., and U.S. Patent Application Pub. No. 2012/0115581 A1, to Allon G. Englman et al., all of which are incorporated herein by reference in their respective entireties and for all purposes.

In response to the aforementioned triggering event and the player's selection of the skill-based game feature, the gaming system 500 and/or gaming terminal 510 initiates play of a skill-based game feature. Concomitant with the play of the skill-based game feature, play of the non-skill-based game feature is simulated on the display device 514 such that the player can see the randomly determined outcome(s) and/or awards associated therewith. By way of non-limiting example, a bonus window 562 appears over the reels 521-525 in FIG. 6, and displays both the free-spin bonus game 546 and the football bonus game 548. In the illustrated embodiment, the plays of the skill-based game feature and the non-skill-based game feature are conducted and displayed substantially simultaneously. However, if the player had elected to initiate and play the non-skill-based game feature (e.g., selected the REEL bonus game button 542 of FIG. 5), the gaming system 500 and/or gaming terminal 510 will only initiate and display play of the non-skill-based game feature. In such an instance, the display device 514 may optionally simulate play of the skill-based game feature such that the player can see some of the potential awards associated with the skill-based game feature; from this, the player may be compelled to try the skill-based game feature at another time.

For some embodiments, play of the skill-based game feature is influenced by the play of the non-skill-based game feature. As one non-limiting example, one or more of the bonus reels 551-555 may bear a skill-game-enhancing symbol (e.g., a free $1^{st}$ DOWN symbol 567) which provides the player with an enhancement to the play the football bonus game 548 (e.g., an automatic first down, as indicated by the down indicator box 569 of FIG. 6) when the symbol 567 appears as part of an outcome during play of the free-spin bonus game 546. Another example can include the size of an award value awarded in the football bonus game 548 being increased or decreased, for example, by a multiplier (e.g., a 2× multiplier symbol 571 on the fourth reel 554 of FIG. 6) awarded during play of the free-spin bonus game 546. In the same vein, play of the non-skill-based game feature can be influenced by the play of the skill-based game feature. For instance, a player completing a touchdown pass in the football bonus game 548 can generate a free enhancement (e.g., a symbol upgrade wherein all kings symbols 573 on the reels 551-555 become wild symbols) in one or more outcomes of the free-spin bonus game 546. Likewise, the size of an award value awarded in one or more of the outcomes in the free-spin bonus game 546 can be increased or decreased by predetermined events occurring during play of the football bonus game 548.

Thus, outcomes in the skill-based component could trigger/alter results in the non-skill-based component, and vice versa. Thus, for example, a "retrigger" event occurring during a non-skill-based free-spin bonus game, which adds additional free spins to the free-spin bonus game sequence, could concomitantly extend play in a skill-based bonus game sequence. By doing this, the skill-based bonus game will likely result in a higher award than if it had not been extended, just as the free-spin bonus game will likely result in a higher award (on average) due to the extra spins. Alternatively, an event in one component could end play in the other component.

Figure 7:
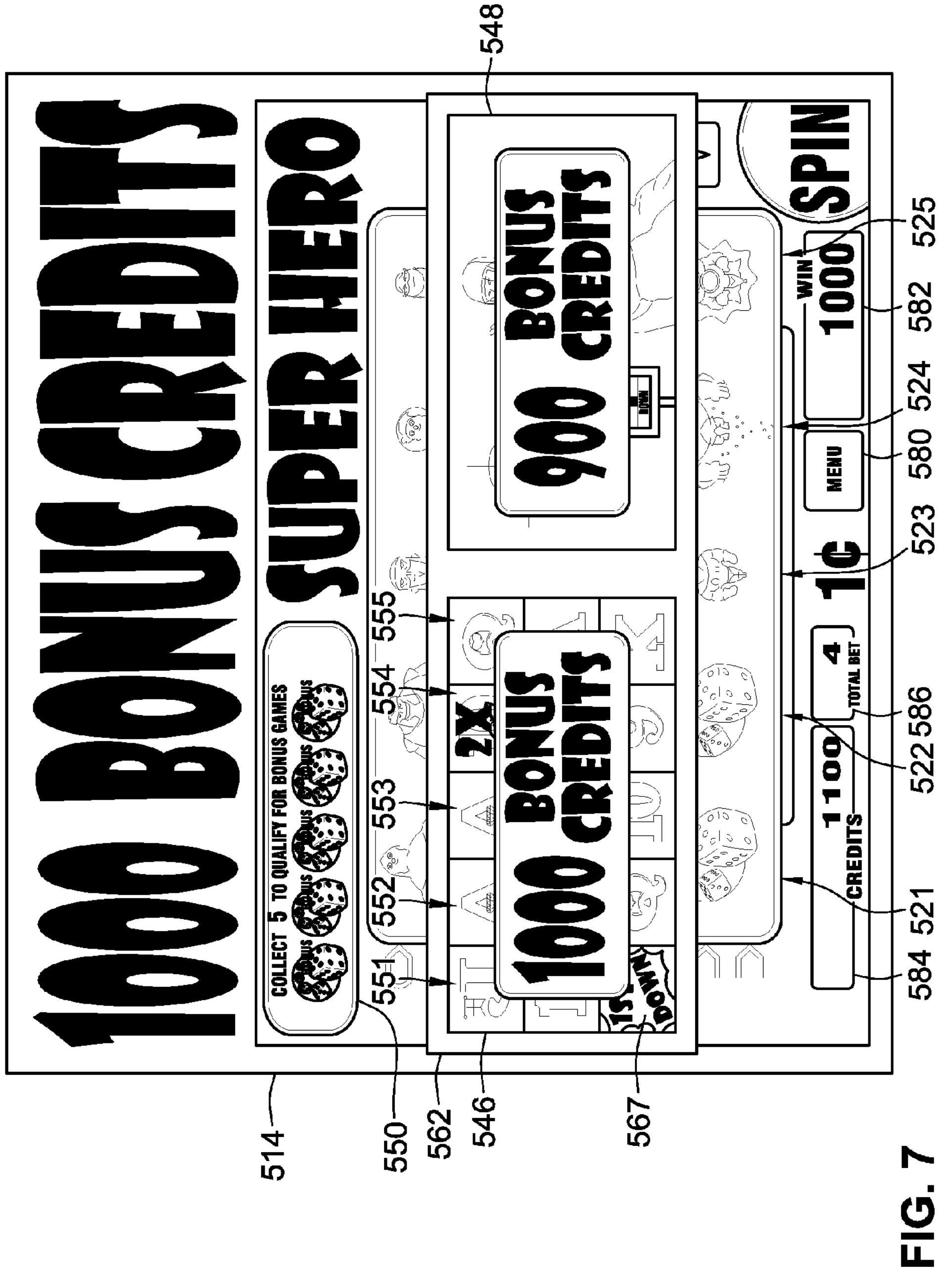
FIG. 7 is a screen shot of the exemplary wagering game of FIG. 4, showing the awards resulting from play of the skill-based and non-skill-based game features, and the awarding of the higher of the awards for the skill-based and non-skill-based game features.

Once the skill-based game feature is completed, as illustrated in FIG. 7, a final/total award is determined and displayed for each game feature. In particular, the gaming system 500 and/or gaming terminal 510 determines a first award value, if any, for the football bonus game 548, and determines a second award value, if any, for the free-spin bonus game 546. According to the illustrated example, the player accumulated 900 BONUS CREDITS during play of the football bonus game 548, e.g., for accomplishing ten (10) first-down completions at 10 credits per completion, four (4) medium completions at 25 credits per completion, five (5) long completions at 40 credits per completion, and five (5) touchdown passes at 100 credits per touchdown. In addition, 1000 BONUS CREDITS were accumulated during play of the free-spin bonus game 546. The player, however, is only awarded the higher of the two award values—e.g., the player wins the 1000 BONUS CREDITS that were awarded during play of the free-spin bonus game 546, but not the 900 BONUS CREDITS that were awarded during play of the football bonus game 548.

With the foregoing game configuration, beginners and less skilled players are not penalized for not being highly skilled at playing a selectable skill-based game feature. As such, a player can choose to play a game of skill without the risk of being penalized for being unskilled since they are guaranteed to win the higher of the two final awards. A player can therefore continue to select the skill-based game feature to improve the corresponding skill, or just to enjoy the game play, without having to forego the possible financial rewards associated with the non-skill-based game feature. Players can also be incentivized to try a skill-based game by offering a higher payout potential in the skill-based game than the non-skill-based game. Another added advantage is that players who are skilled at playing the skill-based game feature will know they were more successful than if they had chosen to play the non-skill-based game feature because final award values are displayed for both game features. This game feature also decreases the perceived risk involved with introducing skill into a wagering game.

According to some additional aspects of the disclosed concepts, the wagering game 530 may be required to pay out a mathematically demonstrable percentage of all amounts wagered (e.g., demonstrable over a statistically significant time period). For some embodiments, this percentage must not be less than approximately seventy-five (75) percent and, in some embodiments, not less than approximately eighty (80) percent and, in some embodiments, approximately eighty-two (82) to ninety-two (92) percent for each wager available for play on the gaming device. For example, each game shall payout a predetermined minimum percentage during the expected lifetime of the game (e.g., approximately 82% of the total wager will be paid out over the cycle of the game, where the cycle is defined to be the set of all possible outcomes). In some configurations, progressive games, community games, merchandise, etc. can be excluded in the percentage payout if they are external to the wagering game. In some configurations, the payout percentage of the skill-based game feature can be greater than the payout percentage of the non-skill-based game feature (e.g., a 90% payout percentage for the skill-based game vs. an 85% payout percentage for the non-skill-based game). In this regard, the payout percentage of the non-skill-based game feature (also referred to herein as "first payout percentage") can be dynamically varied by the gaming system 500 and/or gaming terminal 510 to offset the payout percentage of the skill-based game feature (also referred to herein as "second payout percentage") such that the wagering game is configured to payout a mathematically demonstrable minimum predetermined percentage of all amounts wagered during the expected lifetime of the wagering game. Nevertheless, the payout percentage of either game feature would be designed to fall into any predefined range that is required by local gaming regulations.

Figure 8:
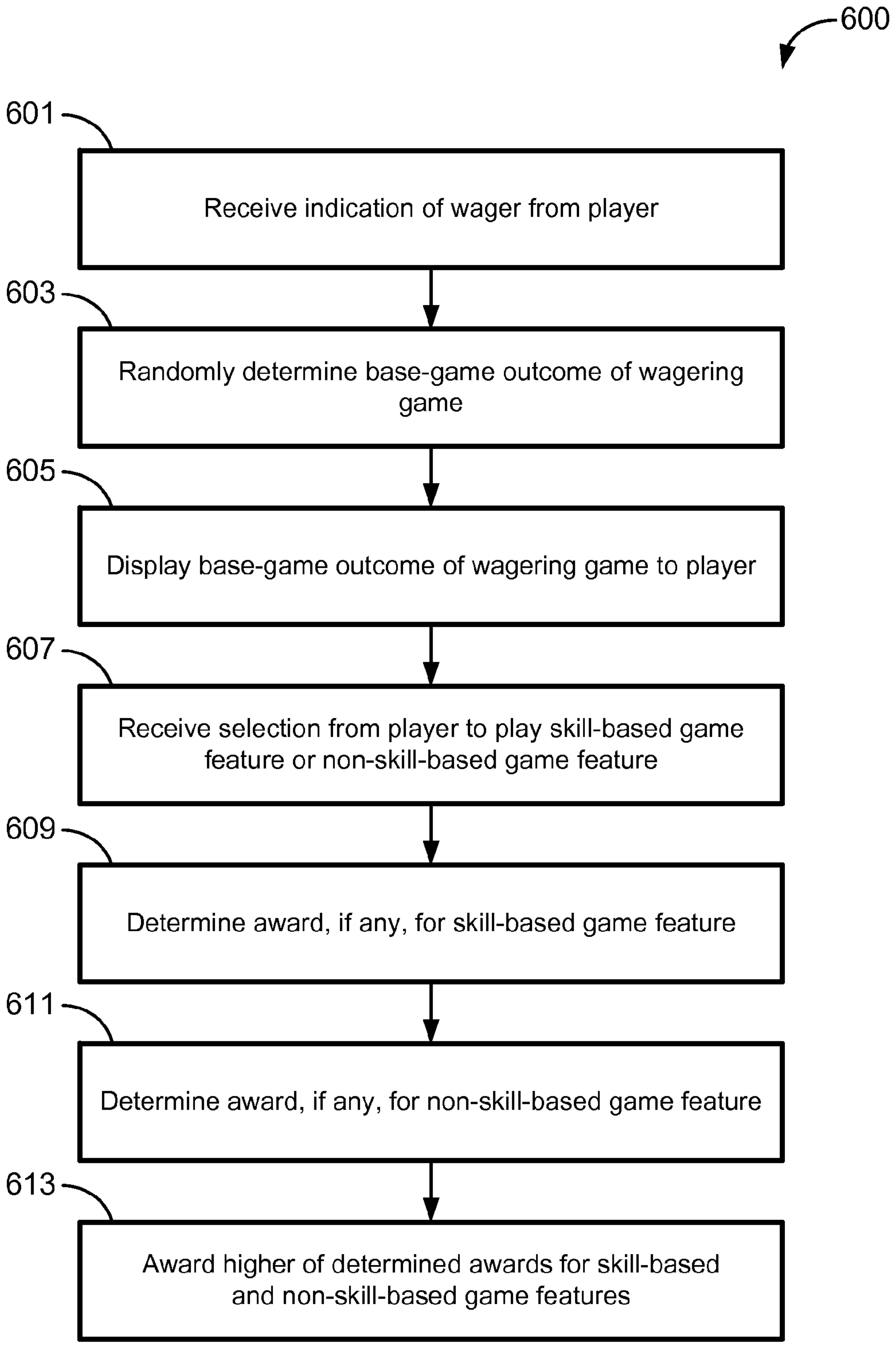
FIG. 8 is a flowchart for an exemplary method or algorithm that can correspond to instructions that can be stored on one or more non-transitory computer-readable media and can be executed by one or more controllers in accord with aspects of the disclosed concepts.

With reference now to the flow chart of FIG. 8, an improved method for conducting a wagering game on a gaming terminal and/or a gaming system, such as those shown in FIGS. 1-4, for example, is generally described at 600 in accordance with aspects of the present disclosure. FIG. 8 can be representative of an algorithm that corresponds to at least some instructions that can be stored, for example, in main memory 32 of FIG. 2, and executed, for example, by the CPU 30 and/or external system(s) 48 of FIG. 2 to perform any or all of the above or below described functions associated with the disclosed concepts. The method 500 will be described with reference to the various aspects and features shown in FIGS. 4-7 of the drawings; such reference is being provided purely by way of explanation and clarification.

The method 600 starts at block 601 by receiving (e.g., via an input device such as touch screen 18, bill validator 22, information reader/writer 24, etc.) an indication of a wager to play a wagering game. At block 603, an outcome of a base-game portion of the wagering game is randomly determined. This may include, as indicated above, an RNG generating a random number, game logic for determining the outcome based on the randomly generated number, and the CPU 30, the external system 48, or both, in alternative embodiments, operating to execute a wagering game program, and game assets (e.g., art, sound, etc.) for presenting the determined outcome to a player in a visual manner. The method 600 then displays the base-game outcome of the wagering game to the player at block 605. The base-game outcome of the wagering game can be visually represented by a plurality of symbols arranged on a display device, such as the symbols on the slot reels 521-525 that are arranged in the symbol array 532 of FIG. 4.

At block 607, the method 600 includes receiving a selection from the player to play the skill-based game feature or the non-skill-based game feature. As indicated in the discussion above, the player may be prompted to make such a selection in response to a bonus-game-triggering outcome occurring in an outcome of the base-game portion of the wagering game. Any of the above-mentioned variations may also apply in this instance, including alternative triggering mechanisms or no triggering mechanism, eligibility requirements, a prerequisite side wager, timing, etc. As seen in FIG. 5, a player can elect to initiate and play in a skill-based game feature by selecting a corresponding button 544, e.g., via an overlaying touch screen on a display device 514 of a gaming terminal 510. Responsive to the player's selection of the skill-based game feature, play of a skill-based game feature (e.g., football bonus game 548) is initiated and, concomitantly, play of a non-skill-based game feature (e.g., free-spin bonus game 546) is initiated such that the player can see the randomly determined outcome(s) and/or awards associated therewith. For some embodiments, if the player had elected to initiate and play the non-skill-based game feature (e.g., selected the REEL bonus game button 542 of FIG. 5), only the non-skill-based game feature is initiated and displayed. In some embodiments, the selection made at block 607 can be omitted altogether, and the player automatically enters into both the skill-based game feature and the non-skill-based game feature.

When play of the skill-based and/or non-skill-based game features are completed, as illustrated in FIG. 7, a final award value is determined and displayed for each game feature. In particular, block 609 includes determining a first award value, if any, for the skill-based bonus game, and block 611 includes determining a second award value, if any, for the non-skill-based bonus game. As indicated at block 613, the player is only awarded the higher of the two award values.

In some embodiments, the method 600 includes at least those steps enumerated above. It is also within the scope and spirit of the present invention to omit steps, include additional steps, and/or modify the order presented above. It should be further noted that the method 600 can be representative of a single play of a wagering game. However, it is expected that the method 600 be applied in a systematic and repetitive manner.

Aspects of this disclosure can be implemented, in some embodiments, through a computer-executable program of instructions, such as program modules, generally referred to as software applications or application programs executed by a computer. The software can include, in non-limiting examples, routines, programs, objects, components, and data structures that perform particular tasks or implement particular abstract data types. The software can form an interface to allow a computer to react according to a source of input. The software can also cooperate with other code segments to initiate a variety of tasks in response to data received in conjunction with the source of the received data. The software can be stored on any of a variety of memory media, such as CD-ROM, magnetic disk, bubble memory, and semiconductor memory (e.g., various types of RAM or ROM).

Moreover, aspects of the present disclosure can be practiced with a variety of computer-system and computer-network configurations, including hand-held devices, multiprocessor systems, microprocessor-based or programmable-consumer electronics, minicomputers, mainframe computers, and the like. In addition, aspects of the present disclosure can be practiced in distributed-computing environments where tasks are performed by remote-processing devices that are linked through a communications network. In a distributed-computing environment, program modules can be located in both local and remote computer-storage media including memory storage devices. Aspects of the present disclosure can therefore, be implemented in connection with various hardware, software or a combination thereof, in a computer system or other processing system.

Any of the methods described herein can include machine readable instructions for execution by: (a) a processor, (b) a controller, and/or (c) any other suitable processing device. Any algorithm, software, or method disclosed herein can be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it can be implemented by an application specific integrated circuit (ASIC), a programmable logic device (PLD), a field programmable logic device (FPLD), discrete logic, etc.). Also, some or all of the machine readable instructions represented in any flowchart depicted herein can be implemented manually. Further, although specific algorithms are described with reference to flowcharts depicted herein, persons of ordinary skill in the art will readily appreciate that many other methods of implementing the example machine readable instructions can alternatively be used. For example, the order of execution of the blocks can be changed, and/or some of the blocks described can be changed, eliminated, or combined.

It should be noted that the algorithms illustrated and discussed herein as having various modules or blocks or steps that perform particular functions and interact with one another are provided purely for the sake of illustration and explanation. It should be understood that these modules are merely segregated based on their function for the sake of description and represent computer hardware and/or executable software code which can be stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While many embodiments and modes for carrying out the present invention have been described in detail above, those familiar with the art to which this invention relates will recognize various alternative designs and embodiments for practicing the invention within the scope of the appended claims.

What is claimed is:

1. A gaming system for conducting a wagering game with a base game, a skill-based game feature and a non-skill based game feature, the skill-based game feature including outcomes based solely or predominantly on player skill, the non-skill-based game feature including outcomes based solely or predominantly on randomized determinations, the gaming system comprising:

one or more processors; and one or more memory devices storing instructions that, when executed by at least one of the one or more processors, cause the gaming system to:

receive an indication of a wager from a player to play the wagering game;

direct at least one display device to display a randomly determined outcome of the base game of the wagering game;

in response to a triggering event, initiate play of the non-skill-based game feature and, further in response to receiving an indication of a player selection of the skill-based game feature, initiate play of the skill-based game feature;

determine a first award value, if any, for the skill-based game feature;

determine a second award value, if any, for the non-skill-based game feature; and award to the player only the higher of the first and second award values.

2. The gaming system of claim 1, wherein the play of the non-skill-based game feature continues until the play of the skill-based game feature is completed.

3. The gaming system of claim 1, wherein the play of the skill-based game feature continues until the play of the non-skill-based game feature is completed.

4. The gaming system of claim 1, wherein the one or more memory devices store additional instructions that cause the gaming system to, in response to the triggering event and receiving an indication of a player selection of the non-skill-based game feature, only initiate play of the non-skill-based game feature.

5. The gaming system of claim 1, wherein a first payout percentage of the non-skill-based game feature is dynamically varied to offset a second payout percentage of the skill-based game feature such that the wagering game is configured to payout a mathematically demonstrable minimum predetermined percentage of all amounts wagered during the expected lifetime of the wagering game.

6. The gaming system of claim 1, wherein a first payout percentage of the skill-based game feature is greater than a second payout percentage of the non-skill-based game feature.

7. The gaming system of claim 1, wherein the play of the skill-based game feature is influenced by the play of the non-skill-based game feature, the play of the non-skill-based game feature is influenced by the play of the skill-based game feature, or both.

8. The gaming system of claim 1, wherein the size of the first award value is influenced by the play of the non-skill-based game feature, the size of the second award value is influenced by the play of the skill-based game feature, or both.

9. The gaming system of claim 1, wherein the opportunity to initiate play of the skill-based game feature is enabled by a secondary wager from the player in addition to the wager to play the wagering game.

10. The gaming system of claim 1, wherein the plays of the skill-based game feature and the non-skill-based game feature are conducted and displayed substantially simultaneously.

11. The gaming system of claim 1, wherein the player selection of the skill-based game feature is received prior to the occurrence of the triggering event.

12. The gaming system of claim 1, wherein the triggering event is a bonus-game-initiating symbol combination in the outcome of the base game.

13. The gaming system of claim 1, wherein the one or more memory devices store additional instructions that cause the gaming system to direct the at least one display device to substantially simultaneously display a randomly determined outcome for the non-skill-based game feature and a player-skill-based outcome for the skill-based game feature.

14. One or more physical non-transitory computer-readable storage media including instructions which, when executed by one or more processors, cause the one or more processors to perform operations comprising:

receive an indication of a wager to play a wagering game;

direct at least one display device to display a randomly determined outcome of a base game of the wagering game;

in response to a triggering event, initiate play of a non-skill-based game feature and, further in response to receiving an indication of a player selection of a skill-based game feature, initiate play of the skill-based game feature;

determine a first award value, if any, for the skill-based game feature;

determine a second award value, if any, for the non-skill-based game feature; and award to a player only the higher of the first and second award values.

15. A gaming system for conducting a wagering game, the gaming system comprising:

one or more input devices;

one or more display devices;

one or more processors; and one or more memory devices storing instructions that, when executed by at least one of the one or more processors, cause the gaming system to:

display, via at least one of the one or more display devices, a randomly determined outcome of a base game portion of the wagering game;

in response to a bonus-game-triggering symbol combination in the outcome of the base game, initiate play of a non-skill-based bonus game and play of a skill-based bonus game;

determine a first award value for a player-skill-based outcome resulting from play of the skill-based bonus game;

determine a second award value for a randomly determined outcome resulting from play of the non-skill-based bonus game; and award to the player only the higher of the first and second award values.

16. A computer-implemented method of conducting a wagering game with a gaming system having one or more input devices, one or more display devices, and one or more processors, the method comprising:

receiving, via at least one of the one or more input devices, an indication of a wager from a player to play the wagering game;

displaying, via at least one of the one or more display devices, a randomly determined outcome of a base game of the wagering game;

in response to a triggering event, initiating play of a non-skill-based game feature and, further in response to receiving an indication of a player selection of a skill-based game feature, initiating play of the skill-based game feature via at least one of the one or more processors;

displaying, via at least one of the one or more display devices, a player-skill-based outcome of the skill-based game feature and a randomly determined outcome of the non-skill-based game feature;

determining a first award value, if any, for the skill-based game feature;

determining a second award value, if any, for the non-skill-based game feature; and awarding to the player only the higher of the first and second award values.

17. The method of claim 16, wherein the play of the non-skill-based game feature continues until the play of the skill-based game feature is completed.

18. The method of claim 16, wherein the play of the skill-based game feature continues until the play of the non-skill-based game feature is completed.

19. The method of claim 16, further comprising, in response to the triggering event and receiving an indication of a player selection of the non-skill-based game feature, only initiating play of the non-skill-based game feature.

20. The method of claim 16, wherein a first payout percentage of the non-skill-based game feature is dynamically varied to offset a second payout percentage of the skill-based game feature such that the wagering game is configured to payout a mathematically demonstrable minimum predetermined percentage of all amounts wagered during the expected lifetime of the wagering game.

21. The method of claim 16, wherein a first payout percentage of the skill-based game feature is greater than a second payout percentage of the non-skill-based game feature.

22. The method of claim 16, wherein the play of the skill-based game feature is influenced by the play of the non-skill-based game feature, the play of the non-skill-based game feature is influenced by the play of the skill-based game feature, or both.

23. The method of claim 16, wherein the size of the first award value is influenced by the play of the non-skill-based game feature, the size of the second award value is influenced by the play of the skill-based game feature, or both.

24. The method of claim 16, wherein the plays of the skill-based game feature and the non-skill-based game feature are conducted and displayed substantially simultaneously.

25. A method of conducting a wagering game on a gaming system having one or more input devices, one or more display devices, and one or more processors, the method comprising:

receiving, via at least one of the one or more input devices, an indication of a wager from a player to play the wagering game;

displaying, via at least one of the one or more display devices, a randomly determined outcome of a base game of the wagering game;

in response to a triggering event, initiating play of a non-skill-based game feature and play of a skill-based game feature via at least one of the one or more processors;

displaying, via at least one of the one or more display devices, a player-skill-based outcome of the skill-based game feature and a randomly determined outcome of the non-skill-based game feature;

determining a first award value, if any, for the skill-based game feature;

determining a second award value, if any, for the non-skill-based game feature; and awarding to the player only the higher of the first and second award values.

* * * * *